United States Patent Office 3,502,634
Patented Mar. 24, 1970

3,502,634
PROCESS AND CATALYST FOR POLYMERIZATION OF ALPHA-MONOOLEFINS HAVING THREE OR MORE CARBON ATOMS PER MOLECULE
Joachim Stedefeder and Hans Lautenschlager, Ludwigshafen (Rhine), Germany, assignors to Phillips Petroleum Company, a corporation of Delaware
No Drawing. Continuation-in-part of application Ser. No. 139,852, Sept. 22, 1961. This application Sept. 21, 1966, Ser. No. 580,856
Claims priority, application Germany, Sept. 24, 1960, B 59,518
Int. Cl. C08f *1/56;* B01j *11/84*
U.S. Cl. 260—93.7                                        13 Claims

ABSTRACT OF THE DISCLOSURE

Alpha-monoolefins are polymerized with a catalyst prepared from an organometal compound such as triethylaluminum or diethylaluminum chloride, a compound of a metal of the fourth to sixth and eighth subgroups, such as a compound of titanium trichloride, and a compound of phosphorus, arsenic, antimony or bismuth, such as triphenylphosphite. Solid thermoplastic polymers are obtained which have many uses such as molding buckets, plates and the like.

---

This is a continuation-in-part of U.S. application Ser. No. 139,852, filed Sept. 22, 1961, now abandoned.

It is known that alpha-monoolefins having three or more carbon atoms, e.g. propylene or 1-butene, can be polymerized to macromolecular substances by means of catalysts prepared from metallo-organic compounds of the first to the fourth main groups and compounds of metals of the fourth to eighth subgroups. Especially suitable catalysts for the polymerization of alpha-monoolefins are aluminum organic compounds and halides of metals of the fourth to the sixth subgroups, especially titanium halides. In the usual process, the polymerization is generally conducted in the presence of invert solvents, for example, aliphatic or aromatic hydrocarbons. It is possible, however, to operate in the absence of solvents.

By polymerization of propylene with these catalysts, so-called isotactic (crystalline) polypropylene is obtained. The isotactic fraction of a propylene polymer is generally considered to be that fraction of the polymer which is insoluble in boiling heptane. By the use of a catalyst system comprising aluminum triethyl and titanium trichloride, one can obtain an isotactic fraction amounting to about 80 percent of the total polymer when propylene is polymerized. By the addition of amines to the catalyst system aluminum triethyl-titanium trichloride, it is possible to increase the isotactic fraction from about 80 percent to about 87 percent.

A process is known in which the heptane-insoluble fraction obtained by stereospecific polymerization of alpha-monoolefins is increased by conducting the polymerization in the presence of salts of ternary or quaternary bases of elements of the fifth or sixth main group of the periodic system along with the previously named catalysts.

An object of this invention is to provide improved polymerization catalysts.

Another object is to increase yields of polymers of olefins from catalytic polymerization processes.

Another object is to improve yields of isotactic polymers.

Other objects and advantages will become apparent to those skilled in the art upon consideration of this disclosure.

It has now been found that alpha-monoolefins having three or more carbon atoms per molecule can be polymerized to obtain polymers with a high heptane-insoluble content by utilizing, along with known catalyst systems prepared from compounds of metals of the fourth to sixth or eighth subgroup and metallo-organic compounds of metals of the first to fourth group of the periodic system, an additional compound having the general formula $AR_3$ or $AR'_3X_2$, where A signifies nitrogen, phosphorus, arsenic, antimony or bismuth, R signifies oxaryl or halogen, R' signifies hydrogen, alkyl, aryl, aralkyl, cycloalkyl, alkoxy, aryloxy or halogen, X (monovalent) signifies halogen, aryl, alkyl, aralkyl, or cycloalkyl and $X_2$ (divalent) signifies oxygen, sulfur, selenium, tellurium, or =NH, compounds of the type $AR_3$ having three halogen atoms being excluded.

As alpha-monoolefins which can be converted to macromolecular polymers having a high heptane-insoluble content, are included, especially, propylene and 1-butene, other alpha-monoolefins are, e.g., 3-methyl-1-butene, 1-pentene, 4-methyl-1-pentene, and 5-methyl-1-hexene.

Compounds of metals of the fourth to sixth and eighth subgroups which can form one part of the catalyst system are, for example, compounds of titanium, vanadium, chromium or iron, e.g. titanium halides such as titanium trichloride, vanadium trichloride, vanadyl chloride, chromium trichloride, chromium oxide, and chromyl chloride. Although, in many cases, the halogen compounds of metals of the fourth to sixth and eighth subgroups can be used with special advantage, compounds of these metals which contain no halogen, for example, titanium acetyl acetonate, can be used.

The metallo-organic compounds include those in which the metal is bound directly to a carbon atom. Suitable metallo-organic compounds of metals of the first to fourth main groups of the periodic system are, for example, lithium butyl, beryllium diethyl, magnesium diethyl, aluminum triethyl, lead tetraethyl, and tin tetraethyl. Other suitable metallo-organic compounds are those which contain not only alkyl groups but also alkoxy groups, for example diethoxy aluminum monoethyl.

The aluminum organic compounds are preferred as catalyst. Suitable aluminum organic compounds are, for example, the aluminum trialkyls such as aluminum trimethyl, aluminum triethyl, aluminum tri-normal-propyl, and aluminum triisobutyl. Aluminum alkyl halides such as diethyl aluminum chloride can be used as catalyst components. It is often advantageous to use mixtures of different metallo-organic compounds.

Compounds of the general formula $AR_3$ or $AR'_3X_2$ in which A, R, R' and X have the aforementioned significance are, for example, phosphoric acid esters, phosphorus acid esters, trialkyl or triaryl phosphine oxides or imines, trialkyl or triaryl phosphinic halides, phosphorus oxyhalides, amine oxides or the corresponding compounds of arsenic antimony or bismuth. Examples of such compounds are: triethylphosphate, tri-normal-butyl phosphate, triphenyl phosphine oxide, triphenylphosphinimine, phosphorus oxychloride, phenyl phosphorus dichloride, N,N-dimethyl aniline oxide, triethyl arsenite, triethyl antimonite, antimony (V) oxychloride, and triphenyl bismuth chloride.

The polymerization catalyst can be prepared by mixing the compound of a metal of the fourth to sixth or eighth subgroup, e.g. titanium trichloride, in the presence or absence of a metallo-organic compound, e.g. aluminum triethyl, optionally in the presence of an inert organic solvent, with the additive compound to act adsorptively in solution or in the gas phase on the metal organic compound and/or the other metal compound to temper the heterogeneous catalyst thus obtained.

The quantities in which the single catalyst components are mixed with each other can vary over a broad range.

The mol ratio of the metal organic compound to the other metal compound can range from 20:1 to 0.2:1, preferably 4:1 to 0.5:1. The mol ratio of metal organic compound to additive compound of nitrogen, phosphorus, antimony, or bismuth can range from 100:1 to 0.5:1, preferably 20:1 to 1:1.

The polymerization is carried out with the hereinbefore described catalysts in the usual manner for low-pressure polymerizations. One can introduce the olefin to be polymerized, e.g. under atmospheric pressure, or at slightly elevated pressures, into a suspension containing the catalyst, the temperature generally being from 0 to 200° C., preferably 30 to 100° C.

The catalyst can be metered in the usual manner in undiluted form or dissolved, partially or completely, or dispersed in the polymerization mixture.

The polymerization can be carried out in the presence of inert solvents, e.g. aliphatic or aromatic hydrocarbons.

By use of the process in accordance with this invention, a polymer having a high heptane-insoluble content can be obtained. As compared with known catalysts, the yields obtained with catalysts according to this invention are significantly increased, e.g. as much as doubled. The oftennoted induction periods accompanying atmospheric pressure operation are, in accordance with the process of the invention, significantly shortened or completely eliminated. A special advantage is that, by the use of the described polymerization catalyst systems, polymers are obtained in especially dense, easily separable form. This fact is of special significance in connection with polymerization at elevated pressures, since suspensions containing substantially heavier polymer particles are more readily stirred and the removal of heat is improved. The polyolefin concentration in the reaction zone can be increased, i.e. the throughput improved significantly, by the process according to this invention.

One specific aspect within the broad invention hereinbefore discussed relates to the use of a specific class of phosphorous containing compounds. This class of compound is the triarylphosphites.

The triarylphosphite aspect is directed to the surprising discovery that triarylphosphites such as triphenylphosphite and other hydrocarbon substituted derivatives thereof such as tri-(nonylphenyl)phosphite produce a polymer when used in conjunction with the above-described catalysts and monomers which has substantially increased flexural modulus and tensile strength and a substantially decreased xylene soluble content, i.e. substantially increased crystalline polymer content, as compared to the same polymer formed in the same manner except with the use of trialkylphosphites instead of triarylphosphites.

According to the triarylphosphite aspect, 1-olefins having at least 3 carbon atoms per molecule, preferably 3 to 7 carbon atoms per molecule, inclusive, are polymerized under polymerization conditions disclosed hereinabove by commingling at least one metal compound of the formula $MCl_3$, i.e. already in the reduced trivalent form, wherein M is titanium, zirconium, or hafnium, at least one compound of the formula $R_mAlX_n$ where R is alkyl, cycloalkyl, aryl, and combinations thereof, preferably alkyl, having from 1 to 20, preferably 1 to 10, carbon atoms, X is halogen, preferably chlorine, $m+n=3$, m is 1, 2, or 3, preferably 2 or 3, and n is 0, 1, or 2, preferably 0 or 1, and at least one triarylphosphite having the formula $(R'O)_3P$, wherein R' is aryl, alkyl substituted aryl, cycloalkyl substituted aryl, and aryl substituted aryl, preferably aryl, wherein the basic (unsubstituted) aryl has 6 to 14 carbon atoms, inclusive, the alkyl, cycloalkyl, and aryl substituents have 1 to 10 carbon atoms, inclusive, and the total number of carbon atoms in the $(R'O)_3P$ molecule is not more than 60, preferably not more than 30.

Examples of suitable components for forming the above-mentioned first mixture include, as the metal halide, titanium trichloride, zirconium trichloride, and hafnium trichloride, and, as the organoaluminum compound, trimethylaluminum,
triethylaluminum,
triisobutylaluminum,
trioctylaluminum,
tridecylaluminum,
tricyclobutylaluminum,
tricycloheptylaluminum,
tricyclodecylaluminum,
tricyclododecylaluminum,
tricyclopentadecylaluminum,
tricycloeicosylaluminum,
triphenylaluminum,
trinaphthyl-1-aluminum,
tri-2-biphenylylaluminum,
tri-1-anthrylaluminum,
tri-2-phenanthrylaluminum,
dimethylaluminum bromide,
diethylaluminum chloride,
diisopentylaluminum iodide,
dioctylaluminum chloride,
didecylaluminum bromide,
ditridecylaluminum fluoride,
diheptadecylaluminum chloride,
dieicosylaluminum iodide,
dicyclopentylaluminum bromide,
dicycloheptylaluminum chloride,
dicyclodecylaluminum iodide,
dicyclotetradecylaluminum fluoride,
dicycloheptadecylaluminum fluoride,
dicycloeicosylaluminum chloride,
diphenylaluminum chloride,
di-3-biphenylylaluminum bromide,
di-2-napthylaluminum iodide,
di-2-anthrylaluminum fluoride,
di-1-phenanthrylaluminum chloride,
methylaluminum dibromide,
isopentylaluminum diiodide,
decylaluminum dibromide,
eicosylaluminum diiodide,
cyclopentylaluminum dibromide,
cyclodecylaluminum diiodide,
cycloeicosylaluminum dichloride,
phenylaluminum dichloride,
3-biphenylylaluminum dibromide,
2-naphthylaluminum diiodide,
2-anthrylaluminum difluoride,
1-phenanthrylaluminum dichloride,
3,5-xylyaluminum dichloride,
p-tolyaluminum dibromide,
mesitylaluminum diiodide,
tris(4-ethylcyclohexyl)aluminum, and the like.

A preferred form of titanium trichloride is aluminum-reduced titanium tetrachloride having an approximate formula: $TiCl_3 \cdot 1/3 AlCl_3$.

Suitable phosphorus containing compounds for the triarylphosphite aspect of this invention include triphenyl phosphite,
tri-1-naphthyl phosphite,
tri-9-anthryl phospite,
tri-4-phenanthryl phosphite,
tri-o-tolyl phosphite,
tri-p-cumenyl phosphite,
tris(4-pentyl-1-naphthyl) phosphite,
tris(3-heptyl-1-anthryl) phosphite,
tris(5-decyl-2-phenanthryl) phosphite,
tris(3-cyclobutylphenyl) phosphite,
tris(6-cycloheptyl-2-naphthyl) phosphite,
tris(10-cyclodecyl-9-anthryl) phosphite,
tris(3-cyclopentylphenyl) phosphite,
tris[4-(2-naphthyl)phenyl phosphite,
tris(7-phenyl-1-naphthyl) phosphite,
tris(6-phenyl-2-anthryl) phosphite,
tris(7-phenyl-1-phenanthryl) phosphite, and the like.

It should be understood that a hydrocarbon substituent on the basic aryl, i.e. on the aromatic nucleus attached to an oxygen atom of the phosphite, can be at any available position on that basic aryl.

Compounds useful in the triarylphosphite aspect of this invention are all well known to those skilled in the art and can be readily made by one skilled in the art.

For the triarylphosphite aspect, the quantities in which the single catalyst components are mixed can vary broadly. The mol ratio of the organoaluminum compound to the metal chloride compound can range from 20:1 to 0.2:1, preferably 4:1 to 0.5:1. The mol ratio of the organoaluminum compound to the triarylphosphite additive can range from 100:1 to 0.5:1, still more preferably 20:1 to 1:1. The polymerization can be carried out in the usual manner for low pressure polymerizations, i.e. under atmospheric or slightly elevated pressures, and temperatures of from 0 to 200, preferably from 30 to 100° C. Polymerization can be carried out in the presence or absence of inert solvents such as aliphatic, cycloaliphatic, or aromatic hydrocarbons, preferably having up to 20 carbon atoms per molecule. Examples of such hydrocarbons include pentane, hexane, heptane, isooctane, eicosane, cyclohexane, methylcyclopentane, benzene, toluene, xylene, naphthalene, anthracene, and the like. The volume ratio of diluent, when used, to monomer to be polymerized can be in the range of from 1:1 to 10:1. Hydrogen can be employed during the polymerization in a concentration of from about 0.08 to about 1 mol percent of the monomer being employed.

For the purpose of this invention heptane and xylene are substantial equivalents in that they extract out amorphous polymer fractions leaving crystalline polymer fractions.

The polymers produced by the catalyst and method of this invention are useful in making molded objects such as buckets, plates, glasses, and the like.

The parts mentioned in the examples are parts by weight.

EXAMPLE I 1.25 parts of titanium trichloride are milled together with 2.78 parts triphenylphosphine oxide in 70 parts of light gasoline fraction for one hour in a ball mill under an argon atmosphere. To the mixture 980 parts of light gasoline fraction and 2.28 parts of aluminum triethyl are added and propylene is introduced, with intensive stirring, at 50° C. for a period of three hours.

The reaction mixture is subsequently deactivated with 5000 parts of methanol and stirred at room temperature for one hour.

The resulting polypropylene is filtered by suction and dried. The yield is 190 parts polypropylene having an intrinsic viscosity $[\eta]$ of 7.15 and a heptane-insoluble fraction of 95.7 percent. When one changes the amount of triphenyl phosphine oxide, one obtains, under otherwise similar conditions, the results shown in the following table:

| Triphenylphosphine oxide, parts | Mol Ratio Al:P | Yield, parts | $[\eta]$* | Heptane-Insoluble Fraction, Percent |
|---|---|---|---|---|
| 0.1 | 55.5:1 | 150 | 6.8 | 83.2 |
| 0.55 | 10:1 | 160 | 7.5 | 89.5 |
| 1.4 | 4:1 | 200 | 7.7 | 90.5 |
| 5.5 | 1:1 | 187 | 9.7 | 95.5 |
| 11.0 | 0.5:1 | 2 | | |

*Dimension 100 ml./g.

In the run without triphenylphosphine oxide, wherein titanium trichloride together with aluminum triethyl are milled, one obtains, under the same conditions, 102 parts polypropylene with $[\eta]=6.3$ and 80.3 percent heptane-insoluble fraction.

EXAMPLE II 1.25 parts of titanium trichloride are milled together with 0.33 parts triethyl phosphite in 70 parts light gasoline fraction as in Example I. The mixture is mixed with 980 parts light gasoline fraction and 2.28 parts aluminum triethyl. Into the suspension obtained, propylene is introduced for a period of three hours, with stirring, at 50° C. Upon processing the reaction mixture as in Example I, one obtains 120 parts polypropylene with $[\eta]=7.6$ and 90.5 percent heptane-insoluble fraction.

EXAMPLE III 1.25 parts titanium trichloride are milled together with 0.5 part tri-n-butyl phosphate in 70 parts low-boiling gasoline fraction as in Example I. The further preparation of the catalyst and the polymeriztaion proceed exactly as in Example I. One obtains 130 parts polypropylene with $[\eta]=7.1$ and 89.1 percent heptane-insoluble fraction.

If one substitutes 0.61 part phosphorus oxychloride for the tri-n-butyl phosphate, one obtained, under otherwise the same conditions, 98 parts of polymer with $[\eta]=6.7$ and 86.7 percent heptane-insoluble fraction.

EXAMPLES IV TO XVI 1.25 parts titanium trichloride are milled together with the activators shown in the table in the quantities shown in said table with 70 parts light gasoline fraction as described in Example I, the further preparation of the catalyst and the polymerization of propylene proceed as in Example I. The results are shown in the following table wherein a=Triphenylphosphine
b=Diphenyl butyl phosphine oxide
c=Triphenylphosphine dibromide
d=Triphenylphosphine diiodide
e=Triphenylphosphate
f=Tricresylphosphate
g=Diethyl ester of benzylphosphonic acid

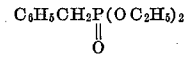

h=4-chlorobenzylphosphonic acid diethylester
i=2,4-dichlorobenzylphosphonic acid diethyl ester
l=Benzyl phenyl phosphinic acid ethyl ester
m=2,5-dimethoxy para xylylene diphosphonic acid tetraethylester

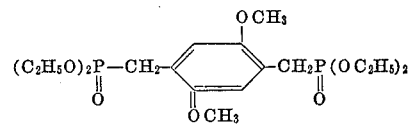

n=Tetramethylene-bis-phosphonic acid tetraethylester

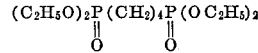

TABLE

| Run | Activator | Quantity of Activator, Parts | Yield, Parts | Intrinsic Viscosity | Heptane-Insoluble Fraction, Percent |
|---|---|---|---|---|---|
| 4 | a | 2.8 | 98 | 8.5 | 91.4 |
| 5 | b | 1.8 | 138 | 7.4 | 85.3 |
| 6 | c | 2.1 | 100 | 6.7 | 88.5 |
| 7 | d | 2.6 | 124 | 5.6 | 82.8 |
| 8 | e | 0.652 | 187 | 6.3 | 85.7 |
| 9 | f | 0.737 | 82 | 6.7 | 87.3 |
| 10 | g | 0.912 | 116 | 5.5 | 87.3 |
| 11 | h | 0.525 | 50 | 7.3 | 90.0 |
| 12 | i | 0.594 | 95 | 7.3 | 85.3 |
| 13 | k | 0.516 | 145 | 7.5 | 91.3 |
| 14 | l | 0.524 | 84 | 5.6 | 85.3 |
| 15 | m | 0.22 | 85 | 5.9 | 88.4 |
| 16 | n | 1.42 | 125 | 8.3 | 91.2 |

EXAMPLE XVII

To a 1-liter, stirred reactor was charged a complex having approximate formula $TiCl_3 \cdot 1/3 AlCl_3$, thereafter diethylaluminum chloride was charged to form a first mixture. To this first mixture a phosphorous containing compound was added, if such was to be added, with stirring.

Finally, 250 grams of propylene and 1 liter of hydrogen (equivalent to 0.67 mol percent hydrogen based on the propylene) was charged and the polymerization carried out in 2½ hour runs at 130 to 160° F. and at about 305 p.s.i.g. Several different runs were made using the above procedure while varying one of (1) the type of phosphorus containing compound employed, (2) the polymerization temperature, and (3) the quantity of phosphorus containing compound used. Mol ratios of the catalyst components employed, the catalyst components themselves, polymerization parameters, and results of the runs are reported in the following Tables I through IV. In Tables I through IV the amount of catalyst employed varied because the weight of the adjuvant, if used, was incorporated into the "catalyst weight percent" figure. Therefore, the "catalyst weight percent" figure varies depending on the composition of the adjuvant and the amount of the adjuvant used.

TABLE I

| Run | Mol Ratio Diethyl-aluminum Chloride | (R'O)₃P | TiCl₃·1/3AlCl₃ | Catalyst, Weight Percent [a] | Temp., °F. | Productivity, g./g. of Ti Complex | Flexural Modulus, p.s.i.×10⁻³ [b] | Xylene Soluble, Weight Percent [c] | Melt Flow [d] | Tensile, p.s.i. [e] |
|---|---|---|---|---|---|---|---|---|---|---|
| 1 | 2 | 0 | 1 | 0.182 | 130 | 511 | 212 | 5.8 | 0.92 | 4,240 |
| 2 | 2 | Triphenyl-phosphite 0.1 | 1 | 0.194 | 130 | 440 | 250 | 2 | 0.99 | 5,150 |
| 3 | 2 | Trihexyl-phosphite 0.1 | 1 | 0.195 | 130 | 547 | 204 | 4.3 | 1.72 | 4,613 |
| 4 | 2 | Trioctyl-phosphite 0.1 | 1 | 0.198 | 130 | 529 | 217 | 4.2 | 4.34 | 4,570 |
| 5 | 2 | Tridecyl-phosphite 0.1 | 1 | 0.202 | 130 | 407 | 214 | 4 | 2.97 | 4,747 |

[a] Based on total weight of propylene employed.
[b] ASTM D 790-61.
[c] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[d] ASTM D 1238-62T, Condition L.
[e] ASTM D 638-61T, crosshead speed of 2 inches per minute.

This table shows that by using triphenylphosphite the flexural modulus and tensile strength of the resulting polymer was substantially increased at the same time the xylene soluble content was substantially decreased over run 1 where no phosphorus containing compound was employed and runs 3 through 5 where trialkylphosphites were used in lieu of the triarylphosphite of run 2. Further, it should be noted that the improved results with the triarylphosphite were obtained with very little change in the melt flow of the resulting polymer whereas, as can be seen from runs 3 through 5, very substantial changes in melt flow were obtained.

TABLE II

| Run | Mol Ratio Diethyl-aluminum Chloride | (R'O)₃P | TiCl₃·1/3AlCl₃ | Catalyst, Weight Percent [a] | Temp., °F. | Productivity, g./g. of Ti Complex | Flexural Modulus, p.s.i.×10⁻³ [b] | Xylene Soluble, Weight Percent [c] | Melt Flow [d] | Tensile, p.s.i. [e] |
|---|---|---|---|---|---|---|---|---|---|---|
| 6 | 2 | Tris-(nonyl-phenyl)-phosphite 0.05 | 1 | 0.19 | 130 | 645 | 232 | 4.5 | 3.2 | 4,850 |
| 7 | 2 | 0.1 | 1 | 0.2 | 130 | 639 | 228 | 4.4 | 4.5 | 4,693 |
| 8 | 2 | 0.2 | 1 | 0.23 | 130 | 624 | 251 | 3.5 | 5.7 | 4,737 |

[a] Based on total weight of propylene employed.
[b] ASTM D 790-61.
[c] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[d] ASTM D 1238-62T, Condition L.
[e] ASTM D 638-61T, crosshead speed of 2 inches per minute.

Table II shows that substantially the same results are obtained with a tri (alkyl substituted aryl) phosphite as were obtained with the triarylphosphite of Table I.

TABLE III

| Run | Mol Ratio Diethyl-aluminum Chloride | (R'O)₃P | TiCl₃·1/3AlCl₃ | Catalyst, Weight Percent [a] | Temp., °F. | Productivity, g./g. of Ti Complex | Flexural Modulus, p.s.i.×10⁻³ [b] | Xylene Soluble, Weight Percent [c] | Melt Flow [d] | Tensile, p.s.i. [e] |
|---|---|---|---|---|---|---|---|---|---|---|
| 9 | 2 | Triphenyl-phosphite 0.05 | 1 | 0.188 | 130 | 499 | 235 | 3 | 0.24 | 4,837 |
| 2 | 2 | 0.1 | 1 | 0.194 | 130 | 440 | 250 | 2 | 0.99 | 5,150 |
| 10 | 2 | 0.2 | 1 | 0.206 | 130 | 346 | 260 | 1.9 | 1.09 | 5,027 |
| 11 | 2 | 0.1 | 1 | 0.194 | 145 | 648 | 223 | 3.4 | 0.24 | 4,793 |
| 12 | 2 | 0.1 | 1 | 0.194 | 160 | 858 | 217 | 4 | 0.83 | 4,607 |

[a] Based on total weight of propylene employed.
[b] ASTM D 790-61.
[c] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[d] ASTM D 1238-62T, Condition L.
[e] ASTM D 638-61T, crosshead speed of 2 inches per minute.

Table III shows by runs 9, 2, and 10 that the results of this invention are obtained when varying amounts of triarylphosphite are employed and by runs 10 through 12 that when the polymerization temperature is varied the results of this invention were still obtained although with increasing temperature the flexural modulus tends to decrease and the xylene soluble content tends to increase.

TABLE IV

| Run | Mol Ratio | | | Catalyst, Weight Percent [a] | Temp., °F. | Productivity, g./g. of Ti Complex | Flexural Modulus, p.s.i.×10⁻³ [b] | Xylene Soluble, Weight Percent [c] | Melt Flow [d] | Tensile p.s.i. [e] |
|---|---|---|---|---|---|---|---|---|---|---|
| | Diethyl-aluminum Chloride | (R'O)₃P | TiCl₃·1/3AlCl₃ | | | | | | | |
| 1 | 2 | 0 | 1 | 0.182 | 130 | 511 | 212 | 5.8 | 0.92 | 4,240 |
| 13 | 2 | 0 | 1 | 0.182 | 145 | 618 | 184 | 8 | 0.28 | 3,810 |
| 14 | 2 | 0 | 1 | 0.182 | 160 | 885 | 160 | 9.6 | 1.04 | 3,337 |

[a] Based on total weight of propylene employed.
[b] ASTM D 790-61.
[c] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[d] ASTM D 1238-62T, Condition L.
[e] ASTM D 638-61T, crosshead speed of 2 inches per minute.

Table IV shows that without the presence of a phosphorus containing compound but with an increase in the polymerization temperature, the flexural modulus tends to decrease and the xylene soluble content tends to increase.

Reasonable variations and modifications are possible within the scope of this disclosure without departing from the spirit and scope thereof.

We claim:

1. In a process for the polymerization of alpha-monoolefins having at least three carbon atoms per molecule to macromolecular polymers having a high content of a fraction insoluble in boiling heptane in the presence of a catalyst system prepared by mixing a trialkyl aluminum with titanium trichloride, the improvement which comprises conducting the polymerization in the presence of a catalyst obtained by commingling, with the catalyst ingredients hereinbefore specified, a compound selected from the group consisting of triaryl phosphine dihalide, dialkyl ester of aralkyl phosphonic acid, dialkyl ester of haloaralkyl phosphonic halides, dialkyl ester of alkoxyaralkyl phosphonic acid, polymethylene-bis-phosphonic acid tetraalkyl ester, dialkoxyparaxylylene diphosphonic acid tetraalkyl ester, and aralkyl aryl phosphinic acid alkyl ester.

2. A process according to claim 1 wherein the polymerization is conducted at a temperature in the range 0 to 200° C., the mol ratio of trialkylaluminum to titanium trichloride being in the range 20:1 to 0.2:1 and the mol ratio of trialkylaluminum to said compound being in the range 100:1 to 0.5:1.

3. The method according to claim 1 wherein said compound is selected from the group consisting of triphenylphosphine dibromide, triphenylphosphine diiodide, diethyl ester of benzylphosphonic acid, 4-chlorobenzylphosphonic acid diethyl ester, 2,4-dichlorobenzylphosphonic acid diethyl ester, 4-methoxybenzylphosphonic acid diethyl ester, benzylphenylphosphinic acid ethyl ester, 2,5-dimethoxy-para-xylylene diphosphonic acid tetraethyl ester, and tetramethylene-bis-phosphonic acid tetraethyl ester.

4. The process according to claim 1 wherein the polymerization is conducted at a temperature in the range of 30 to 100° C., and in the presence of a catalyst system prepared by mixing a trialkyl aluminum with titanium trichloride in the mol ratio of trialkyl aluminum to titanium trichloride in the range of from 20:1 to 0.2:1, and wherein the improvement comprises conducting the polymerization in the presence of a catalyst obtained by commingling with the catalyst ingredients hereinbefore specified, 4-methoxybenzylphosphonic acid diethyl ester, the mol ratio of trialkyl aluminum to the ester being in the range of 100:1 to 0.5:1.

5. An improved polymerization catalyst composition prepared by commingling a trialkylaluminum, titanium trichloride, and a phosphorous compound selected from the group consisting of triaryl phosphine dihalide, dialkyl ester of aralkyl phosphonic acid, dialkyl ester of haloaralkyl phosphonic halides, dialkyl ester of alkoxyaralkyl phosphonic acid, polymethylene-bis-phosphonic acid tetraalkyl ester, dialkoxyparaxylylene diphosphonic acid tetraalkyl ester, and aralkyl aryl phosphinic acid alkyl ester, the mol ratio of trialkylaluminum to titanium trichloride being in the ratio 20:1 to 0.2:1, and the mol ratio of trialkylaluminum to said phosphorus compound being in the range 100:1 to 0.5:1.

6. The composition according to claim 5 wherein said phosphonic compound is selected from the group consisting of triphenylphosphine dibromide, triphenylphosphine diiodide, diethyl ester of benzylphosphonic acid, 4-chlorobenzylphosphonic acid diethyl ester, 2,4-dichlorobenzylphosphonic acid diethyl ester, 4-methoxybenzylphosphonic acid diethyl ester, benzylphenylphosphinic acid ethyl ester, 2,5-dimethoxy-para-xylylene diphosphonic acid tetraethyl ester, and tetramethylene-bis-phosphonic acid tetraethyl ester.

7. A catalyst according to claim 5 wherein said phosphorous compound is tetramethylene-bis-phosphonic acid tetraethylester.

8. A catalyst according to claim 5 wherein said phosphorus compound is diethyl ester of benzylphosphonic acid.

9. A catalyst according to claim 5 wherein said phosphorus compound is triphenylphosphine dibromide.

10. A polymerization process comprising contacting a 1-olefin having from 3 to 7, inclusive, carbon atoms per molecule under polymerization conditions including a temperature in the range of 0 to 200° C. with a catalyst formed by bringing together at least one compound of TiCl₃, at least one organoluminum compound of R₃Al or R₂AlCl where R is alkyl having from 1 to 20 carbon atoms, and at least one compound of (R'O)₃P where R' is aryl having 6 to 14 carbon atoms, the mole ratio of organoaluminum to TiCl₃ is 20:1 to 0.2:1, and the mol ratio of organoaluminum to (R'O)₃P is 100:1 to 0.5:1.

11. The method according to claim 10 wherein said organoaluminum is diethylaluminum chloride, and said (R'O)₃P is triphenylphosphite.

12. An improved catalyst composition formed by bringing together at least one compound of TiCl₃, at least one organoaluminum compound of R₃Al or R₂AlCl where R is alkyl having from 1 to 20 carbon atoms, and at least zone compound of (R'O)₃P where R' is aryl, having 6 to 14 carbon atoms, inclusive, the mol ratio of said organoaluminum to TiCl₃ is 20:1 to 0.2:1 and the mol ratio of said organoaluminum to (R'O)₃P is 100:1 to 0.5:1.

13. The composition according to claim 12 wherein said organoaluminum is diethylaluminum chloride, and said (R'O)₃P is triphenylphosphite.

(References on following page)

References Cited

UNITED STATES PATENTS
3,032,510  5/1962  Tornquist et al. ---- 260—93.7

FOREIGN PATENTS
921,635  3/1963  Great Gritain.
1,231,089  9/1960  France.
608,467  3/1962  Belgium.

JAMES A. SEIDLECK, Primary Examiner
E. J. SMITH, Assistant Examiner

U.S. Cl. X.R.
252—429